(12) United States Patent
Yang

(10) Patent No.: US 9,803,799 B1
(45) Date of Patent: Oct. 31, 2017

(54) MULTI-FUNCTIONAL SUPPORT POLE AND ROTATION TELESCOPIC CONTROL STRUCTURE THEREOF

(71) Applicant: Shenzhen Annaijia Electronics Co., Ltd., Shenzhen (CN)

(72) Inventor: Weiyu Yang, Shenzhen (CN)

(73) Assignee: SHENZHEN ANNAIJIA ELECTRONICS CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/413,363

(22) Filed: Jan. 23, 2017

(51) Int. Cl.
| | |
|---|---|
| *G03B 17/56* | (2006.01) |
| *F16M 13/02* | (2006.01) |
| *F16B 7/14* | (2006.01) |
| *F16M 11/28* | (2006.01) |

(52) U.S. Cl.
CPC ............ *F16M 13/02* (2013.01); *F16B 7/149* (2013.01); *G03B 17/561* (2013.01); *F16M 11/28* (2013.01); *F16M 2200/022* (2013.01); *F16M 2200/027* (2013.01); *F16M 2200/06* (2013.01)

(58) Field of Classification Search
CPC .. G03B 17/561; G03B 17/563; G03B 17/565; G03B 17/566; F16M 11/28; F16M 13/02; H04M 1/0264

USPC .................. 248/277.1, 125.8, 292.12, 309.1; 396/419, 428; 455/575.1; 379/454, 455
See application file for complete search history.

(56) References Cited

U.S. PATENT DOCUMENTS

| | | | | |
|---|---|---|---|---|
| 9,170,473 B1* | 10/2015 | Li | ........................... | F16M 11/28 |
| 2013/0176412 A1* | 7/2013 | Chen | ..................... | H04N 7/183 348/77 |
| 2015/0346590 A1* | 12/2015 | Lewis | .................. | G03B 17/561 362/109 |
| 2016/0381192 A1* | 12/2016 | Sherman | .............. | G03B 17/566 455/575.3 |
| 2017/0009802 A1* | 1/2017 | Uke | ..................... | G03B 17/561 |
| 2017/0055698 A1* | 3/2017 | Jose | .......................... | A45F 3/04 |

* cited by examiner

*Primary Examiner* — Todd M Epps
(74) *Attorney, Agent, or Firm* — Leong C. Lei

(57) ABSTRACT

A multi-functional support pole and a rotation telescopic control structure thereof are provided. The multi-functional support pole includes a base, a first rigid tube, a second rigid tube, a third rigid tube, a rotation telescopic control assembly, a vertical rotation folding control assembly, and an apparatus mounting portion to realize the functions of a 360-degree horizontal rotation, an up-down extension, a vertical rotation angle adjustment, and so on. The size of the support pole is reduced after folding. The whole support pole is mainly composed of rigid tubes to improve the structural strength of the support pole and the stability of use.

7 Claims, 13 Drawing Sheets

MULTI-FUNCTIONAL SUPPORT POLE AND ROTATION TELESCOPIC CONTROL STRUCTURE THEREOF

FIELD OF THE INVENTION

The present invention relates to a support pole, and more particularly to a multi-functional support pole and a rotation telescopic control structure thereof used for supporting a mobile phone, a tablet computer, a computer auxiliary apparatus, or a multi-media apparatus.

BACKGROUND OF THE INVENTION

A conventional support poles has some drawbacks. For example, it is inconvenient to adjust the angle of the support pole as desired; the overall size of the support pole is big, which is inconvenient for storage and carrying; in order to allow a certain degree of deformation for adjusting the angle of the support pole, the support pole is composed of soft tubes. When in use, the support pole may shake and is not stable, so the user needs to re-adjust the location of the support pole many times. Accordingly, the inventor of the present invention has devoted himself based on his many years of practical experiences to solve these problems.

SUMMARY OF THE INVENTION

The primary object of the present invention is to provide a multi-functional support pole and a rotation telescopic control structure thereof to realize the functions of a 360-degree horizontal rotation, an up-down extension, a vertical rotation angle adjustment, and so on. The size of the support pole is reduced after folding. The whole support pole is mainly composed of rigid tubes to improve the structural strength of the support pole and the stability of use.

According to an aspect of the present invention, a rotation telescopic control structure used for a support pole is provided. The rotation telescopic control structure comprises a first rigid tube, a second rigid tube, an inner sleeve, and an outer sleeve. The inner sleeve has a first connecting portion and a second connecting portion. The first connecting portion is connected to the second rigid tube. The second connecting portion has two or more pawls to form a deformable fitting trough. A gap is formed between the adjacent pawls. An outside of each pawl is formed with outer threads. The outer sleeve has a first receiving trough therein. The first receiving trough includes an upper press-fit locking trough, a middle unlocking trough, and a lower inner threaded trough which penetrate through the first receiving trough. An inner wall surface of the upper press-fit locking trough has a press-fit surface which is gradually enlarged from top to bottom. The middle unlocking trough has a cross-section greater than that of the upper press-fit locking trough. The first connecting portion has a second receiving trough penetrating the deformable fitting trough. A stop stepped face is formed between an inner wall surface of the second receiving trough and inner wall surfaces of the pawls. The first rigid tube is inserted into the second receiving trough. An upper end of the first rigid tube abuts against a lower side of the stop stepped face. An inner wall surface of the first rigid tube is provided with a first telescopic limit projection. A lower end of the second rigid tube is provided with an end plug. A lower end of the end plug having a second telescopic limit protrusion projecting outwardly from an outer surface of the second rigid tube. The second rigid tube is inserted through the deformable fitting trough into the first rigid tube. The outer sleeve is screwed to an outside of the inner sleeve. The inner threaded trough is mated with the outer threads. The second telescopic limit protrusion is limited below the first telescopic limit protrusion.

Preferably, the first rigid tube and the second rigid tube are metal tubes.

According to another aspect of the present invention, a multi-functional support pole is provided. The multi-functional support pole comprises a base, a first rigid tube, a second rigid tube, a third rigid tube, a rotation telescopic control assembly, a vertical rotation folding control assembly, and an apparatus mounting portion for mounting an apparatus. A lower end of the first rigid tube is connected to the base. The rotation telescopic control assembly is connected between the first rigid tube and the second rigid tube. The vertical rotation folding control assembly is connected between the second rigid tube and the third rigid tube. The third rigid tube is rotatable and foldable relative to the second rigid tube. The apparatus mounting portion is connected to the third rigid tube. The rotation telescopic control assembly includes an inner sleeve and an outer sleeve. The inner sleeve has a first connecting portion and a second connecting portion. The first connecting portion is connected to the second rigid tube. The second connecting portion has two or more pawls to form a deformable fitting trough. A gap is formed between the adjacent pawls. An outside of each pawl is formed with outer threads. The outer sleeve has a first receiving trough therein. The first receiving trough includes an upper press-fit locking trough, a middle unlocking trough, and a lower inner threaded trough which penetrate through the first receiving trough. An inner wall surface of the upper press-fit locking trough has a press-fit surface which is gradually enlarged from top to bottom. The middle unlocking trough has a cross-section greater than that of the upper press-fit locking trough. The first connecting portion has a second receiving trough penetrating the deformable fitting trough. A stop stepped face is formed between an inner wall surface of the second receiving trough and inner wall surfaces of the pawls. The first rigid tube is inserted into the second receiving trough. An upper end of the first rigid tube abuts against a lower side of the stop stepped face. An inner wall surface of the first rigid tube is provided with a first telescopic limit projection. A lower end of the second rigid tube is provided with an end plug. A lower end of the end plug having a second telescopic limit protrusion projecting outwardly from an outer surface of the second rigid tube. The second rigid tube is inserted through the deformable fitting trough into the first rigid tube. The outer sleeve is screwed to an outside of the inner sleeve. The inner threaded trough is mated with the outer threads. The second telescopic limit protrusion is limited below the first telescopic limit protrusion.

Compared to the prior art, the present invention has obvious advantages and beneficial effects. Specifically, according to the aforesaid technique, the present invention is able to achieve the functions of a 360-degree horizontal rotation, an up-down extension, a vertical rotation angle adjustment, and so on, meeting the different demands of users. The support pole can be folded and unfolded easily. The size of the support pole is reduced after folding, which is convenient for storage and carrying. The support pole of the present invention is designed more humanized than the traditional support pole. The whole support pole is mainly composed of rigid tubes to improve the structural strength of the support pole and the stability of use and to prolong the service life of the support pole.

DETAILED DESCRIPTION OF THE PREFERRED EMBODIMENTS

Figure 1:
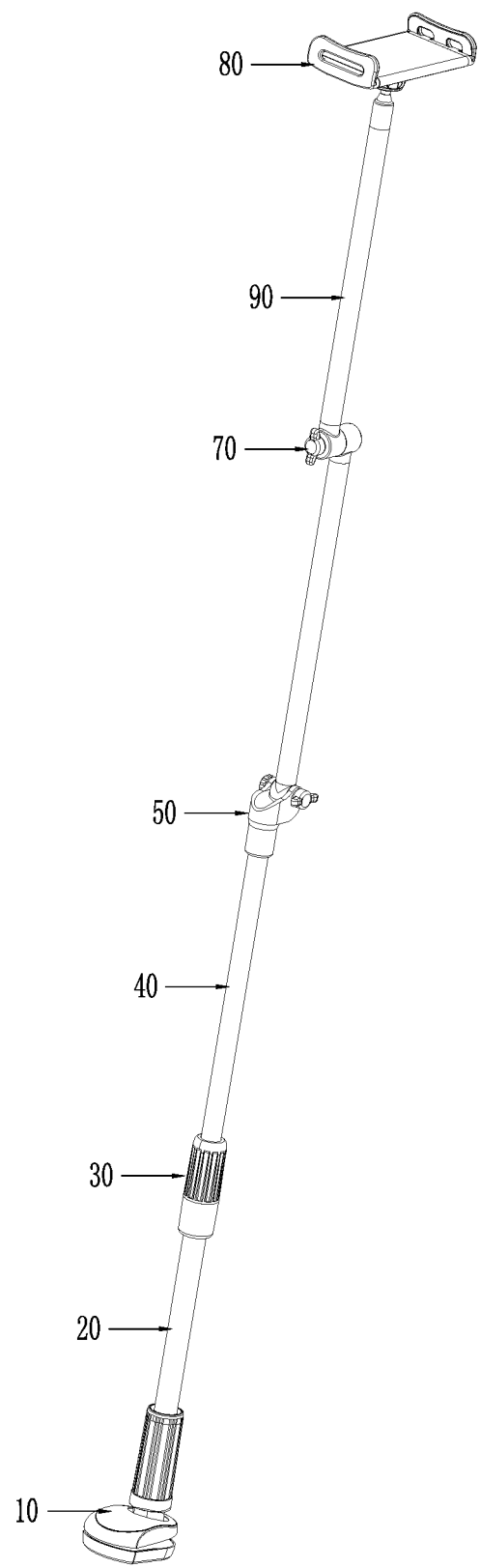
FIG. 1 is a perspective view according to an embodiment of the present invention.
Figure 2:
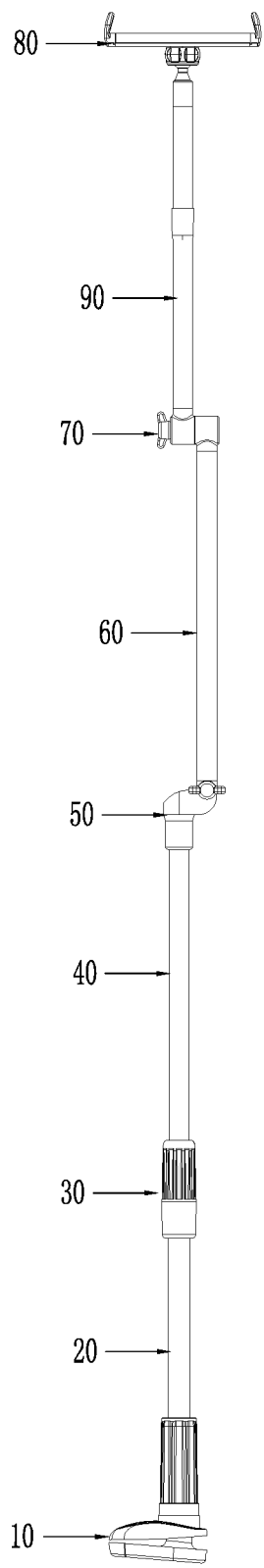
FIG. 2 is a front view according to the embodiment of the present invention.

Embodiments of the present invention will now be described, by way of example only, with reference to the accompanying drawings.

As shown in FIG. 1 through FIG. 12, a preferred embodiment of the present invention comprises a base 10, a first rigid tube 20, a rotation telescopic control assembly 30, a second rigid tube 40, a first vertical rotation folding control assembly 50, a third rigid tube 60, a second vertical rotation folding control assembly 70, and an apparatus mounting portion 80 for mounting an apparatus. The first rigid tube 20, the second rigid tube 40, the third rigid tube 60 and a fourth rigid tube 90 described below are preferably metal tubes, such as aluminum alloy tubes or the like which is excellent in structural strength and excellent stability in use. The base 10 may be provided with a data charging interface or the like.

The second rigid tube 40 is inserted downwardly into the first rigid tube 20. The second rigid tube 40 is rotatable about the rotation telescopic control assembly 30 and can be horizontally rotated 360 degrees relative to the first rigid tube 20. The second rigid tube 40 is disposed in an up-down telescopic manner relative to the first rigid tube 20. The third rigid tube 60 is rotatable about the first vertical rotation folding control assembly 50 and is rotatably folded or unfolded in a first vertical plane relative to the second rigid tube 40. The apparatus mounting portion 80 is rotatable about the second vertical rotation folding control assembly 70 and is rotatably folded or unfolded in a second vertical plane relative to the third rigid tube 60. The first vertical plane and the second vertical plane are perpendicular to each other. In a folded state, the third rigid tube 60 and the second rigid tube 40 are parallel to each other.

Figure 3:
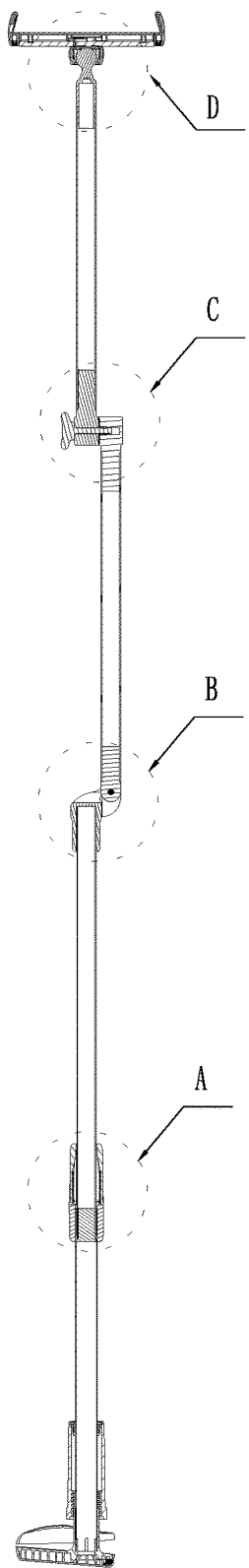
FIG. 3 is a sectional view according to the embodiment of the present invention.
Figure 4:
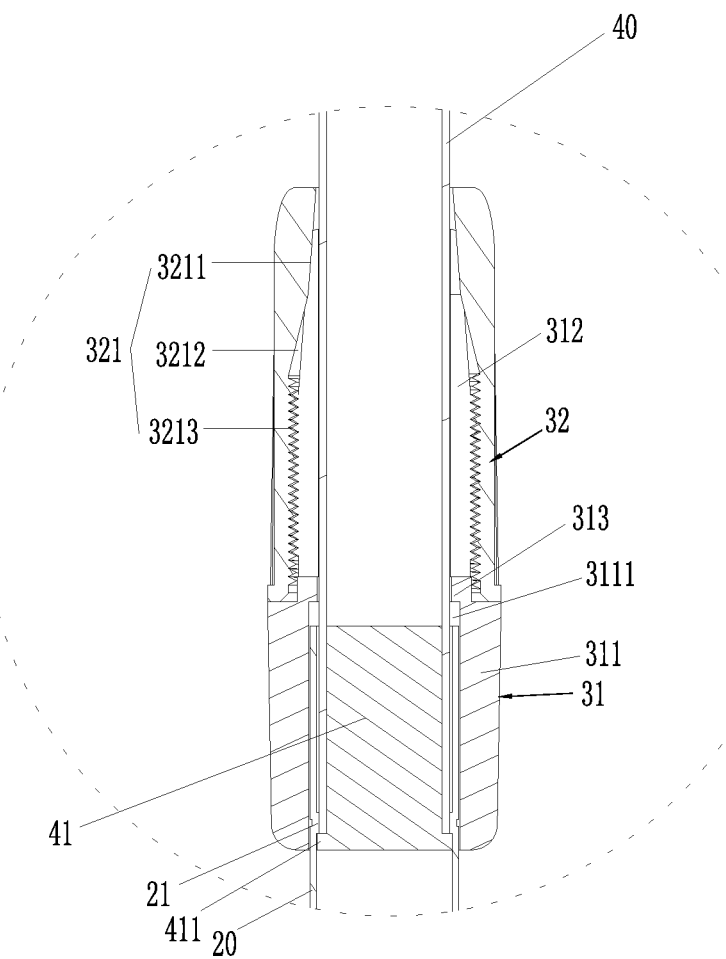
FIG. 4 is an enlarged view taken from a circle A of FIG. 3.

As shown in FIG. 3 and FIG. 4, the rotation telescopic control assembly 30 includes an inner sleeve 31 and an outer sleeve 32. The inner sleeve 31 has a first connecting portion 311 and a second connecting portion 312. The first connecting portion 311 is connected to the second rigid tube 40. The second connecting portion 312 has two or more pawls to form a deformable fitting trough, and a gap is formed between the adjacent pawls. An outside of each pawl is formed with outer threads. The outer sleeve 32 has a first receiving trough 321 therein. The first receiving trough 321 includes an upper press-fit locking trough 3211, a middle unlocking trough 3212, and a lower inner threaded trough 3213 which penetrate through the first receiving trough 321. An inner wall surface of the upper press-fit locking trough 3211 has a press-fit surface which is gradually enlarged from top to bottom. The middle unlocking trough 3212 has a cross-section greater than that of the upper press-fit locking trough 3211.

The first connecting portion 311 has a second receiving trough 3111 penetrating the deformable fitting trough. A stop stepped face 313 is formed between an inner wall surface of the second receiving trough 3111 and inner wall surfaces of the pawls. The first rigid tube 20 is inserted into the second receiving trough 3111. An upper end of the first rigid tube 20 abuts against a lower side of the stop stepped face 313. An inner wall surface of the first rigid tube 20 is provided with a first telescopic limit projection 21. A lower end of the second rigid tube 40 is provided with an end plug 41. A lower end of the end plug 41 has a second telescopic limit protrusion 411 projecting outwardly from an outer surface of the second rigid tube 40. The second rigid tube 40 is inserted through the deformable fitting trough into the first rigid tube 20. The outer sleeve 32 is screwed to an outside of the inner sleeve 31. The inner threaded trough 3213 is mated with the outer threads. The second telescopic limit protrusion 411 is limited below the first telescopic limit protrusion 21.

Figure 9:
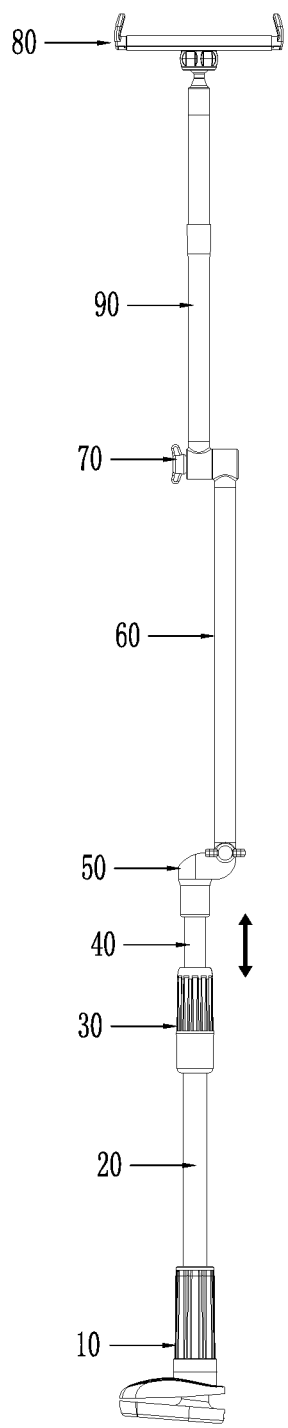
FIG. 9 is a schematic view of the embodiment of the present invention in a folded state.

In the locked state, the press-fit surface of the outer sleeve 32 tightens all the pawls, and the pawls brace the second rigid tube 40. During the rotational adjustment of an angle, the press-fit surface of the outer sleeve 32 is moved upwardly away from the pawls to release the pawls. The middle unlocking trough 3212 is displaced up to the position that the press-fit surface initially braces the pawls. At this time, the pawls don't brace the second rigid tube 40, so that the second rigid tube 40 can be rotated freely, achieving a 360-degree horizontal rotation. The second rigid tube 40 can be rotated to a desired angle. Meanwhile, the second rigid tube 40 can be extended and retracted in the first rigid tube 20, and its telescopic state is as shown in FIG. 9.

Figure 5:
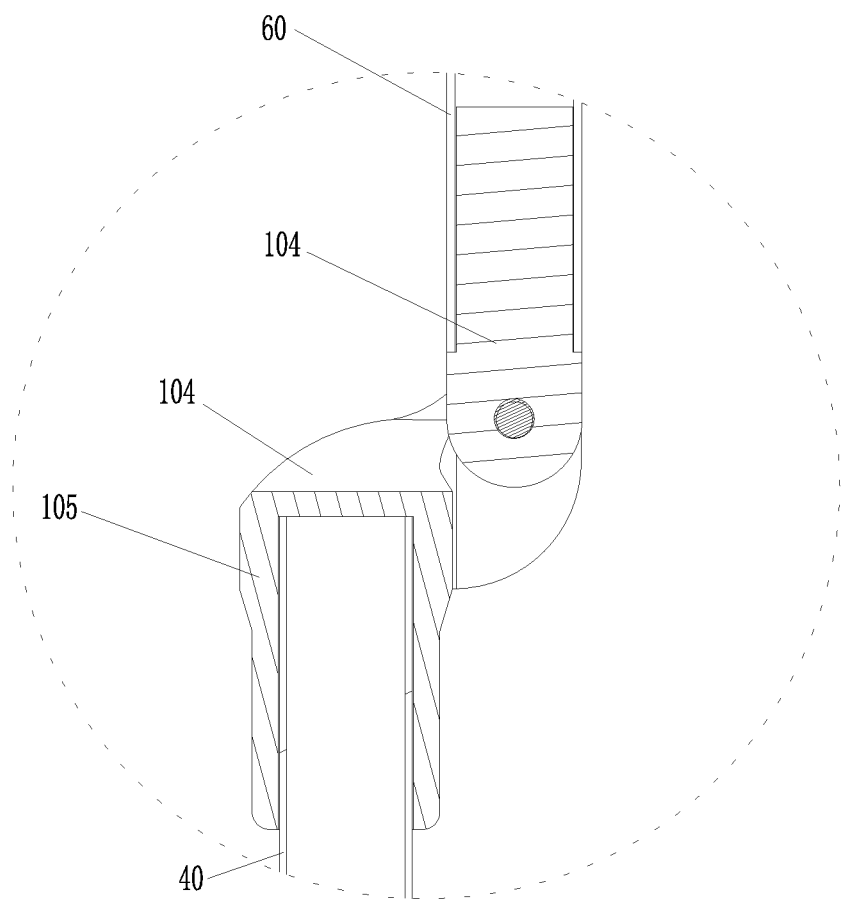
FIG. 5 is an enlarged view taken from a circle B of FIG. 3.
Figure 6:
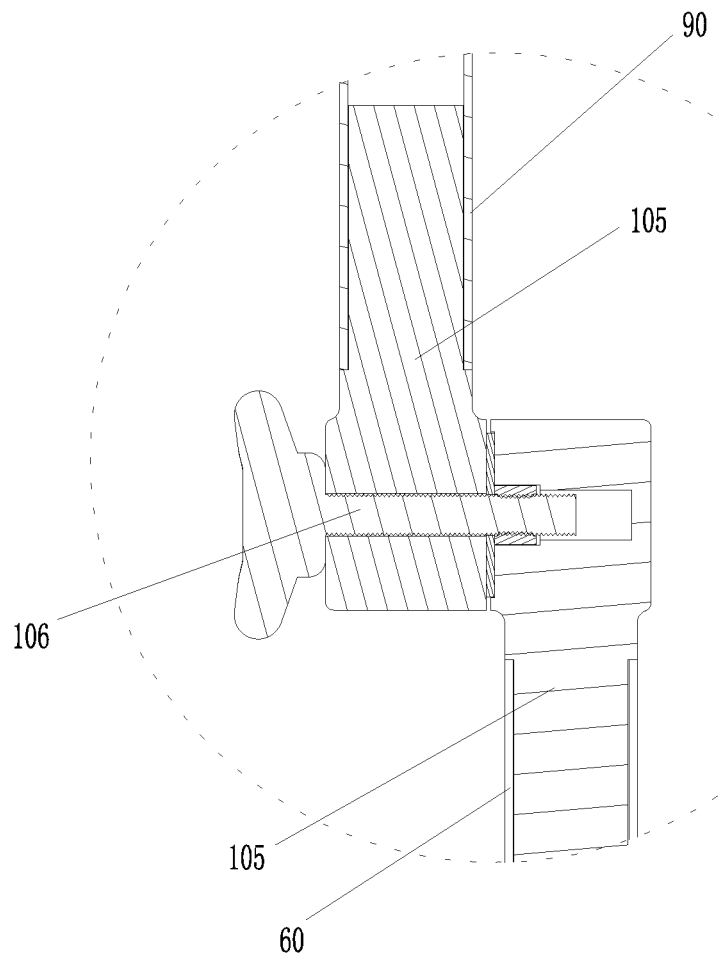
FIG. 6 is an enlarged view taken from a circle C of FIG. 3, showing a screw locking rotation control structure.
Figure 7A:
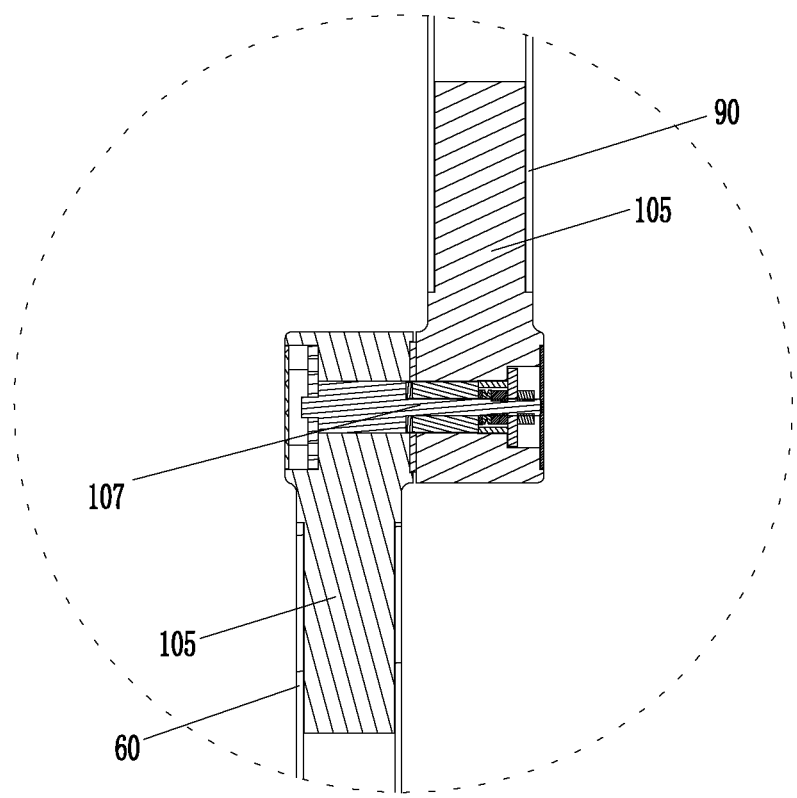
FIG. 7(a) is an enlarged view, showing another rotation control way (a damping rotation control structure) of the first or second vertical rotation folding control assembly according to the embodiment of the present invention.
Figure 7B:
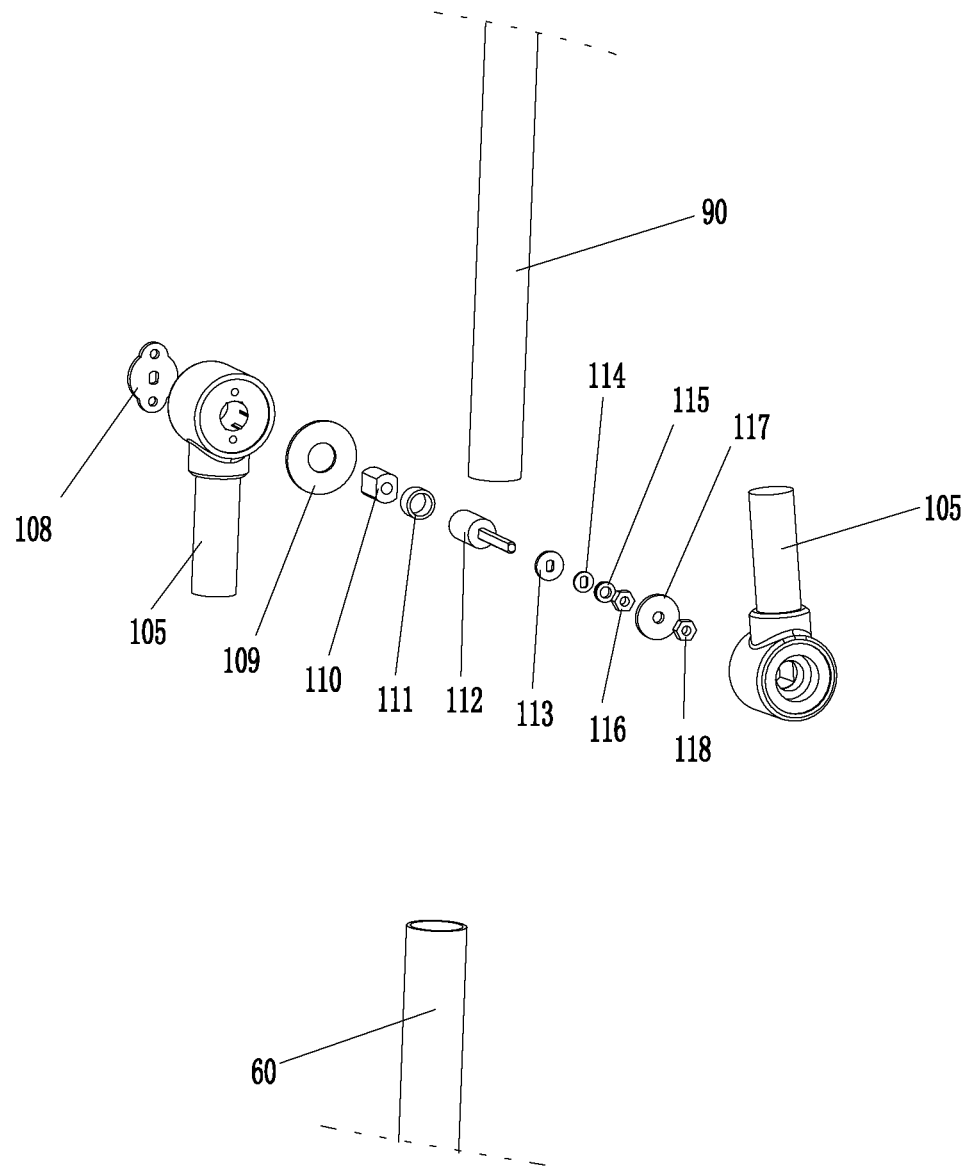
FIG. 7(b) is an exploded view of FIG. 7(a)

As shown in FIG. 3, FIG. 5 and FIG. 6, the first vertical rotation folding control assembly 50 and the second vertical rotation folding control assembly 70 each include a pivot assembly and two connecting pivot seats 105 that are pivotally connected to the pivot assembly. The pivot assemblies of the first vertical rotation folding control assembly 50 and the second vertical rotation folding control assembly 70 are parallel to each other in the axial direction and are located in a transverse plane. The pivot assembly is a screw locking rotation control structure 106. A screw is used to lock or unlock the two connecting pivot seats 105, so that the two connecting pivot seats 105 can be relatively rotated or fixed. As shown in FIGS. 7 (a) and 7 (b), the pivot assembly is a damping rotation control structure 107. The corresponding rigid tubes are held for the rotation action. The operation is relatively more convenient. The damping rotation control structure 107 includes a shaft fixing piece 108, a first damping sheet 109, a damping sleeve 110, a damping outer sleeve 111, a damping shaft 112, a spacer 113, a damping tightness adjustment ring 114, a second damping sheet 115, a nut 116, a third damping sheet 117, and a bolt 118.

Figure 8:
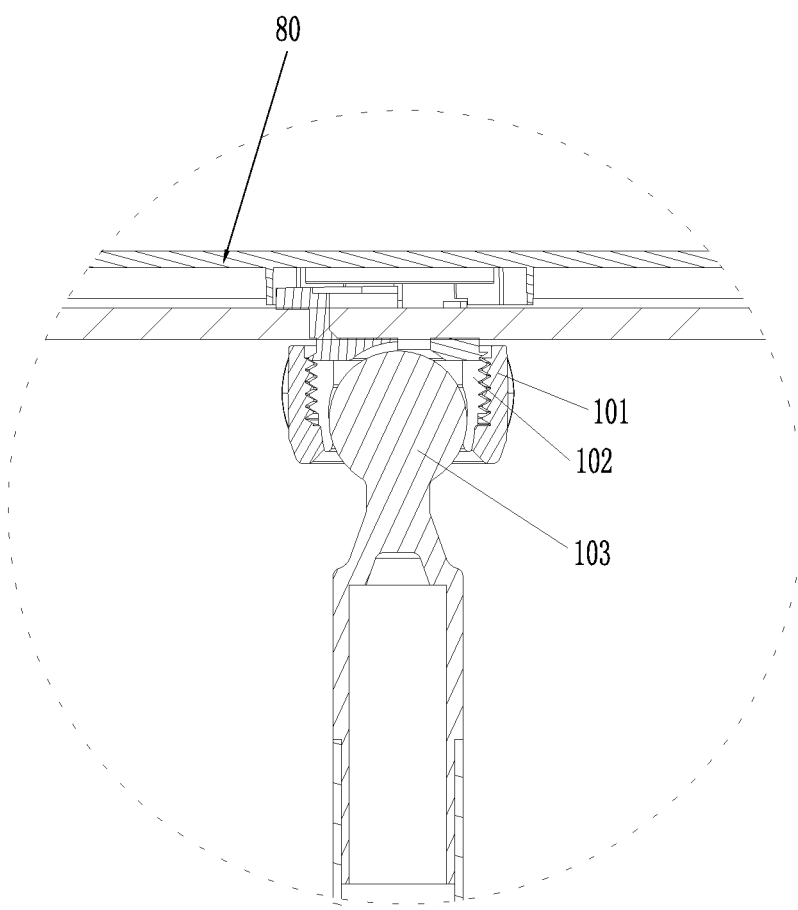
FIG. 8 is an enlarged view taken from a circle D of FIG. 3.

As shown in FIG. 3 and FIG. 8, the fourth rigid tube 90 is connected between the apparatus mounting portion 80 and the second vertical rotation folding control assembly 70. A ball universal joint assembly is connected between the apparatus mounting portion 80 and an upper end of the fourth rigid tube 90. In general, the ball universal joint assembly comprises an outer bracket 101, an inner spherical claw 102, and a ball joint shaft 103. A ball end of the ball joint shaft 103 is fitted in the inner spherical claw 102. The outer bracket 101 is mated with the outer periphery of the inner spherical claw 102. A pivot end of the ball joint shaft 103 is connected with the upper end of the fourth rigid tube 90 (including direct connection or through other fittings). When the outer bracket 101 is loosened, the ball end of the ball joint shaft 103 can be rotated in a multi-directional manner.

Figure 10:
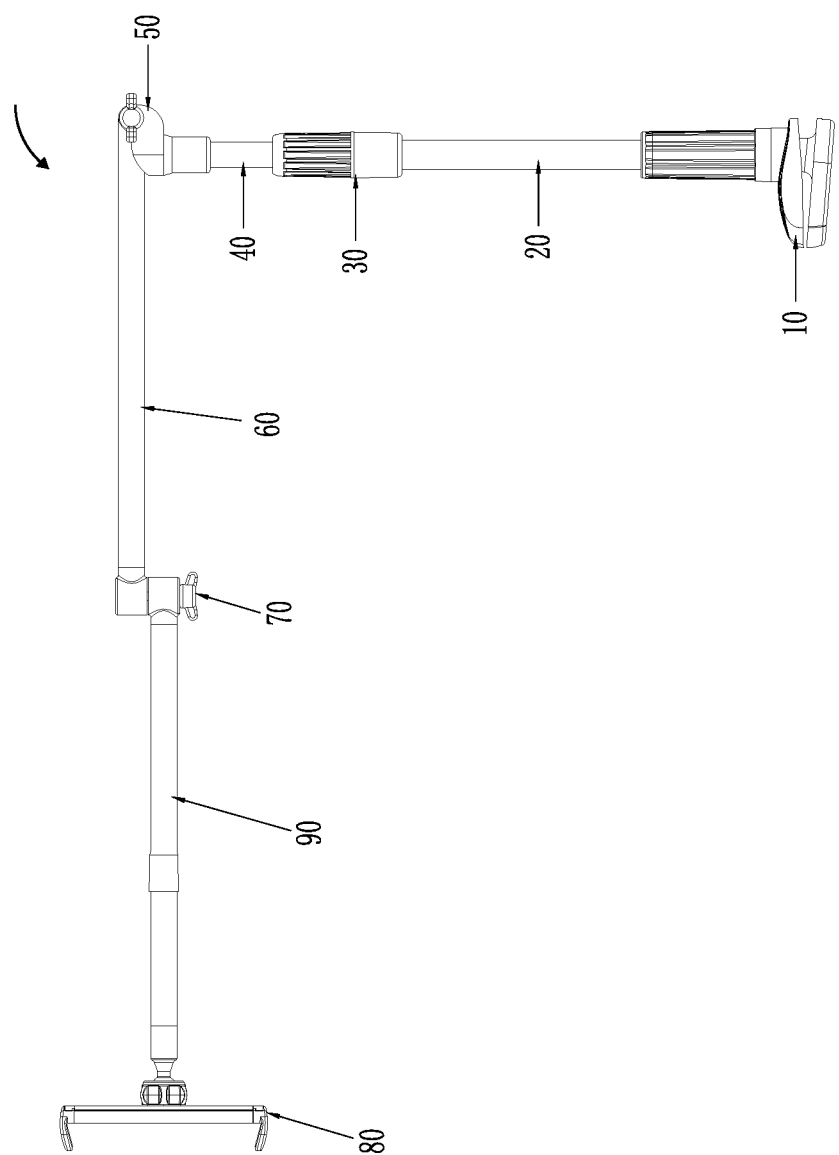
FIG. 10 is a schematic view showing that the third rigid tube is turned 90 degrees according to the embodiment of the present invention.
Figure 11:
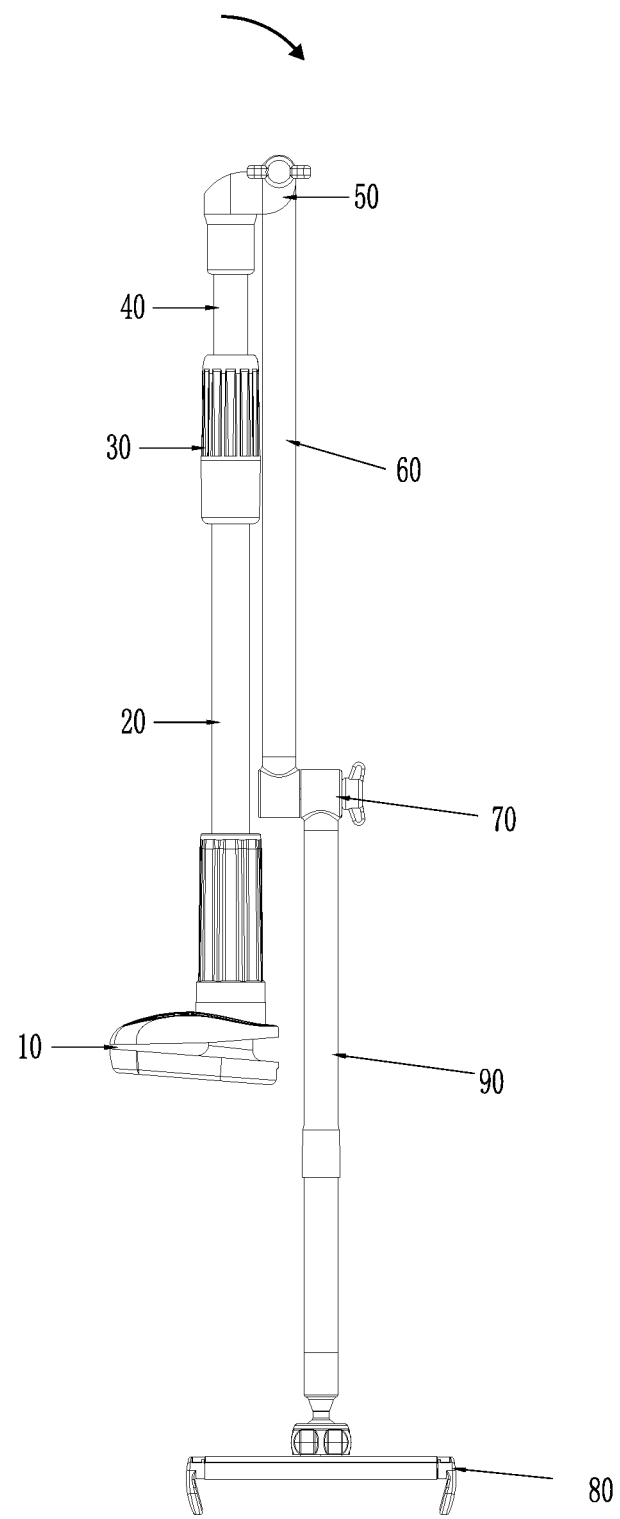
FIG. 11 is a schematic view showing that the third rigid tube is turned to be parallel to the second rigid tube according to the embodiment of the present invention.
Figure 12:
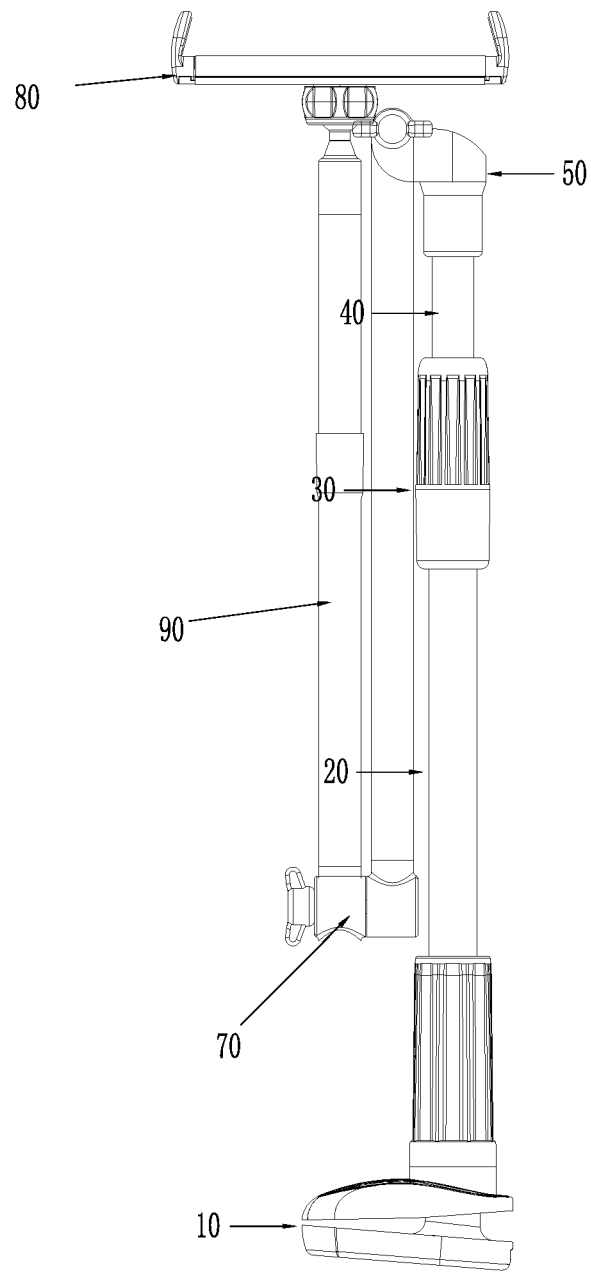
FIG. 12 is a schematic view showing that the whole support pole is fully folded according to the embodiment of the present invention.

As shown in FIG. 3, FIG. 5 and FIG. 10, the upper end of the second rigid tube 40, the lower end of the third rigid tube 60, the upper end of the third rigid tube 60, and the lower end of the fourth rigid tube 90 are connected to respective connecting pivot seats 105. The connecting pivot seat 105 connected to the upper end of the second rigid tube 40 and the connecting pivot seat 105 connected to the upper end of the third rigid tube 60 are formed with respective rotation limitation stop surfaces 104 for limiting the rotation angles of the third rigid tube 60 and the fourth rigid tube 90 respectively. The rotation range of the third rigid tube 60 is from the corresponding rotation limit stop surface 104 to a position in which the third rigid tube 60 is turned downwardly parallel to the second rigid tube 40. The rotation range of the fourth rigid tube 90 is from the corresponding rotation limit stop surface 104 to a position in which the fourth rigid tube 90 is turned downwardly parallel to the third rigid tube 60. Here, the first vertical rotation folding control unit 50 is provided with the rotation limit stop surface 104, and the connection pivot seat 105 connected with the second rigid tube 40 is provided with the aforementioned rotation limit stop surface 104. In the unfolded state, the third rigid tube 60 is located on the right side of the second rigid tube 40 and parallel to the second rigid tube 40. The fourth rigid tube 90 is located on the left side of the third rigid tube 60 and in the same axial direction as the second rigid tube 40. The third rigid tube 60 can turn left 90 degrees and turn right 180 degrees to be parallel to the second rigid tube 40. The fourth rigid tube 90 can turn left or right 180 degrees.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A rotation telescopic control structure used for a support pole, comprising a first rigid tube, a second rigid tube, an inner sleeve, and an outer sleeve; the inner sleeve having a first connecting portion and a second connecting portion, the first connecting portion being connected to the second rigid tube, the second connecting portion having two or more adjacent pawls to form a deformable fitting trough, a gap being formed between the adjacent pawls, an outside of each pawl being formed with outer threads; the outer sleeve having a first receiving trough therein, the first receiving trough including an upper press-fit locking trough, a middle unlocking trough, and a lower inner threaded trough which penetrate through the first receiving trough, an inner wall surface of the upper press-fit locking trough having a press-fit surface which is gradually enlarged from top to bottom, the middle unlocking trough having a cross-section greater than that of the upper press-fit locking trough;

the first connecting portion having a second receiving trough penetrating the deformable fitting trough, a stop stepped face being formed between an inner wall surface of the second receiving trough and inner wall surfaces of the pawls, the first rigid tube being inserted into the second receiving trough, an upper end of the first rigid tube abutting against a lower side of the stop stepped face; an inner wall surface of the first rigid tube being provided with a first telescopic limit projection, a lower end of the second rigid tube being provided with an end plug, a lower end of the end plug having a second telescopic limit protrusion projecting outwardly from an outer surface of the second rigid tube;

the second rigid tube being inserted through the deformable fitting trough into the first rigid tube, the outer sleeve being screwed to an outside of the inner sleeve, the inner threaded trough being mated with the outer threads, the second telescopic limit protrusion being limited below the first telescopic limit protrusion.

2. The rotation telescopic control structure used for a support pole as claimed in claim 1, wherein the first rigid tube and the second rigid tube are metal tubes.

3. A multi-functional support pole, comprising a base, a first rigid tube, a second rigid tube, a third rigid tube, a rotation telescopic control assembly, a vertical rotation folding control assembly, and an apparatus mounting portion for mounting an apparatus; a lower end of the first rigid tube being connected to the base, the rotation telescopic control assembly being connected between the first rigid tube and the second rigid tube, the vertical rotation folding control assembly being connected between the second rigid tube and the third rigid tube, the third rigid tube being rotatable and foldable relative to the second rigid tube, the apparatus mounting portion being connected to the third rigid tube;

the rotation telescopic control assembly including an inner sleeve and an outer sleeve; the inner sleeve having a first connecting portion and a second connecting portion, the first connecting portion being connected to the second rigid tube, the second connecting portion having two or more adjacent pawls to form a deformable fitting trough, a gap being formed between the adjacent pawls, an outside of each pawl being formed with outer threads; the outer sleeve having a first receiving trough therein, the first receiving trough including an upper press-fit locking trough, a middle unlocking trough, and a lower inner threaded trough which penetrate through the first receiving trough, an inner wall surface of the upper press-fit locking trough having a press-fit surface which is gradually enlarged from top to bottom, the middle unlocking trough having a cross-section greater than that of the upper press-fit locking trough;

the first connecting portion having a second receiving trough penetrating the deformable fitting trough, a stop stepped face being formed between an inner wall surface of the second receiving trough and inner wall surfaces of the pawls, the first rigid tube being inserted into the second receiving trough, an upper end of the first rigid tube abutting against a lower side of the stop stepped face; an inner wall surface of the first rigid tube being provided with a first telescopic limit projection, a lower end of the second rigid tube being provided with an end plug, a lower end of the end plug having a second telescopic limit protrusion projecting outwardly from an outer surface of the second rigid tube; the second rigid tube being inserted through the deformable fitting trough into the first rigid tube, the outer sleeve being screwed to an outside of the inner sleeve, the inner threaded trough being mated with the outer threads, the second telescopic limit protrusion being limited below the first telescopic limit protrusion.

4. The multi-functional support pole as claimed in claim 3, wherein the third rigid tube is connected between the first connecting portion and the base.

5. The multi-functional support pole as claimed in claim 4, wherein the first rigid tube, the second rigid tube, and the third rigid tube are metal tubes.

6. The multi-functional support pole as claimed in claim 5, wherein the first rigid tube, the second rigid tube, and the third rigid tube are aluminum alloy tubes.

7. The multi-functional support pole as claimed in claim 3, wherein the vertical rotation folding control assembly includes a pivot assembly and two connecting pivot seats pivotally connected to the pivot assembly, the pivot assembly is a screw locking rotation control structure or a damping rotation control structure, the lower end of the second rigid tube and the upper end of the first rigid tube are connected to the respective connecting pivot seats.

* * * * *